United States Patent [19]
Fujii et al.

[11] Patent Number: 5,183,011
[45] Date of Patent: Feb. 2, 1993

[54] METHOD OF CONTROLLING THE SUPPLY OF FUEL IN HYDROGEN-FUELED ENGINE

[75] Inventors: Isao Fujii; Yoshio Ajiki; Yoichi Ishida; Hiromi Matsuura, all of Saitama, Japan

[73] Assignee: Honda Giken Kogyo Kabushiki Kaisha, Tokyo, Japan

[21] Appl. No.: 870,543

[22] Filed: Apr. 17, 1992

[30] Foreign Application Priority Data

Apr. 17, 1991 [JP] Japan .................................. 3-85489

[51] Int. Cl.$^5$ .......................................... F02B 75/12
[52] U.S. Cl. ............................ 123/1 A; 123/DIG. 12
[58] Field of Search ............... 123/DIG. 12, 1 A, 1 R

[56] References Cited

U.S. PATENT DOCUMENTS

| | | | |
|---|---|---|---|
| 4,018,190 | 4/1977 | Henault | 123/DIG. 12 |
| 4,389,981 | 6/1983 | Meyer | 123/DIG. 12 |
| 4,508,064 | 4/1985 | Watanabe | 123/DIG. 12 |
| 4,520,763 | 6/1985 | Lynch et al. | 123/DIG. 12 |
| 4,567,857 | 2/1986 | Houseman et al. | 123/DIG. 12 |
| 5,067,447 | 11/1991 | Iwaki et al. | 123/DIG. 12 |
| 5,115,768 | 5/1992 | Peschka et al. | 123/DIG. 12 |

FOREIGN PATENT DOCUMENTS

223703  5/1990  Japan .
243026  9/1990  Japan .

Primary Examiner—E. Rollins Cross
Assistant Examiner—Erick Solis
Attorney, Agent, or Firm—Lyon & Lyon

[57] ABSTRACT

A hydrogen-fueled engine has an intake valve, a hydrogen supply valve and an exhaust valve, which are operated to open and close relative to a combustion chamber, and a control valve provided in a hydrogen supply pipe to control the output of the engine through the control of the flow amount of hydrogen. This control valve is a pressure control valve to adjust the pressure of hydrogen to be supplied. The hydrogen supply valve is operated by an apparatus of the type capable of adjusting the lift and the valve timing. In this engine, the hydrogen to be supplied to the combustion chamber is controlled on the basis of control signals corresponding to load conditions by both the pressure control valve and the hydrogen supply valve under at least one of either the low-load condition or the high-load condition, and substantially only by the pressure control valve under an intermediate-load condition.

7 Claims, 3 Drawing Sheets

METHOD OF CONTROLLING THE SUPPLY OF FUEL IN HYDROGEN-FUELED ENGINE

BACKGROUND OF THE INVENTION

This invention relates to a method of controlling the fuel in a hydrogen-fueled engine.

One means of controlling the fuel in a conventional gas-fueled engine is disclosed in Japanese Published Examined Patent Application No. 23703/1990, in which a fuel intake passage is provided separate from the air intake passage and each of the passages is controlled by a throttle valve. Another fuel control means is disclosed in Japanese Published Examined Patent Application No. 43026/1990, in which there are provided, in parallel, a premixed gas passage for feeding air and the fuel after mixing them together and a direct injection passage for directly injecting the fuel into the engine so that the above-mentioned two passages can be used either separately or together depending on the load or the rotational speed.

However, since the throttle valve in the former publication has manufacturing errors and the premixed gas passage in the latter publication has lower adjustment accuracies near the minimum and the maximum opening degrees, it is practically impossible to accurately control the fuel amount. The graphs of FIG. 4(a) and FIG. 4(b) show controllable ranges of the output Ps and the rotational speed Ne by the conventional throttle valve at high and low hydrogen fuel supply pressures Ph, respectively. It is impossible to accurately control the hydrogen amount over the entire control ranges in either of the conditions in which the hydrogen supply pressure Ph is kept constant at a high pressure or in which it is kept constant at a low pressure.

If the hydrogen supply pressure Ph is kept constant at a high pressure, an accurate control can be made in the region $A_1$ in FIG. 4(a) and therefore it is possible to obtain and maintain a target maximum output Ps max. However, since there is a limit to the minimum area that can be obtained accurately due to the manufacturing errors or the like of the valve system, it is impossible to accurately control a minimum hydrogen supply amount. As a result, the control becomes inaccurate in the low-load region including idling rotation, i.e., in the region $B_1$ in FIG. 4(a).

On the other hand, if the hydrogen supply pressure Ph is kept constant at a low pressure, a stable control can be made in the region $A_2$ in FIG. 4(b), but the control becomes unstable in the region $B_2$ where the load is high and the hydrogen supply amount is subject to limitations. The reason is that, when a curve Pc in FIG. 5 is supposed to denote the change in the cylinder internal pressure P in accordance with the crank rotational angle $\Theta ca$, the crank angle $\Theta_1$ at the point where the hydrogen pressure Ph and the internal pressure Pc coincide is the supply limit and, consequently, the hydrogen supply amount above the low hydrogen supply pressure Ph is restricted.

OBJECT AND SUMMARY OF THE INVENTION

This invention has an object of providing a method of carrying out an accurate fuel control irrespective of the magnitude of the load as well as of the hydrogen pressure changes so that an accurate fuel control can be made over the entire ranges of the intermediate-load region $A_3$, the low-load region $B_3$, and the high-load region $B_4$ shown in FIG. 3.

In order to attain the above-mentioned object, there is provided a method of controlling the fuel in a hydrogen-fueled engine comprising an intake valve, a hydrogen supply valve and an exhaust valve, each of the valves being operated to open and close relative to a combustion chamber, and a control valve provided in a hydrogen supply pipe to control the output of the engine through the control of the flow amount of the hydrogen, the control valve being a pressure control valve to adjust the pressure of the hydrogen to be supplied, the hydrogen supply valve being of a type capable of adjusting the lift and the valve timing, wherein the method is characterized in that the hydrogen to be supplied to the combustion chamber is controlled based on control signals corresponding to load conditions by both the pressure control valve and the hydrogen supply valve under at least one of either the low-load condition and the high-load condition, and substantially only by the pressure control valve under an intermediate-load condition.

Since the method of this invention is arranged as described above, the required amount of fuel is supplied through adjustment of the fuel amount by controlling mainly the pressure control valve under an intermediate-load condition, and by controlling the lift and the valve timing of the hydrogen control valve under a high-load condition and/or a low-load condition aside from the control by the pressure control valve.

BRIEF DESCRIPTION OF THE DRAWINGS

The above and other objects and the attendant advantages of this invention will become readily apparent by reference to the following detailed description when considered in conjunction with the accompanying drawings wherein.

DETAILED DESCRIPTION OF A PREFERRED EMBODIMENT

Figure 1:
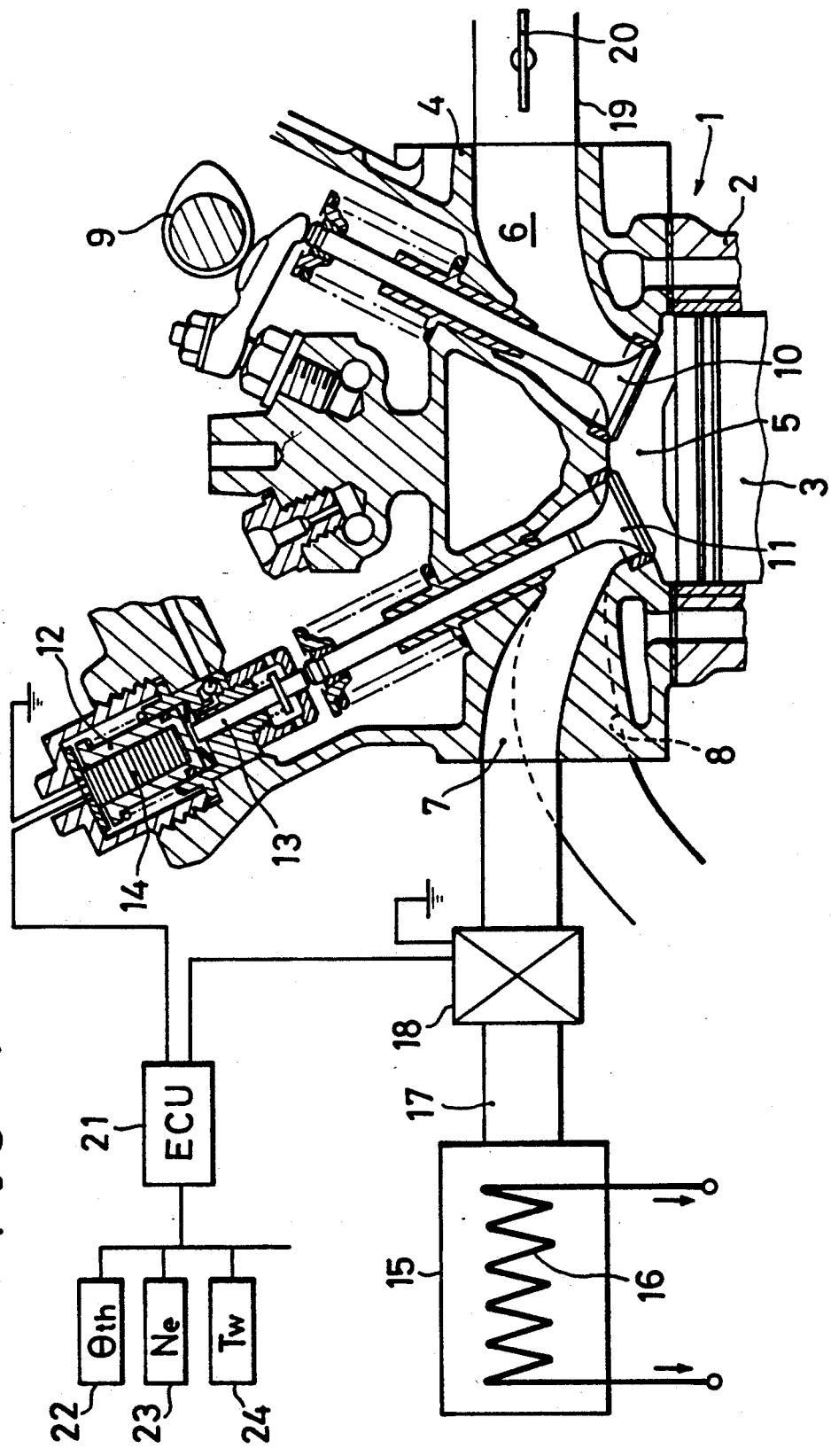
FIG. 1 is a schematic diagram of the components of an internal combustion engine and controls used for the method of this invention as applied to that engine.

An embodiment of this invention will now be described. In FIG. 1, numeral 1 denotes a hydrogen-fueled engine, numeral 2 denotes its cylinder block, numeral 3 denotes a piston, numeral 4 denotes a cylinder head, and numeral 5 denotes combustion chamber. In the cylinder head 4, there are provided an intake port 6, a hydrogen supply port 7 and an exhaust port 8, each of which is in fluid flow communication with the combustion chamber. In the intake port 6, there is provided an intake valve 10 which is driven by a cam 9. The exhaust port 8 is provided with an exhaust valve (not shown) which is driven by a cam (not shown), all in a conventional manner.

In the hydrogen supply port 7, there is provided a hydrogen supply valve 11 that is urged in the open direction by an electrostrictive actuator 12 via a rod 13. The electrostrictive actuator 12 comprises a multitude of laminated piezoelectric elements 14 that increase in thickness in accordance with the voltage applied thereto to thereby push the rod 13 toward the hydrogen supply valve 11.

Hydrogen gas is stored in a storage container 15 in an adsorbed condition into, e.g., a hydrogen-adsorbing alloy metal. The adsorbed hydrogen is released by heating with a heat exchanger 16 through which engine cooling water is caused to flow, and flows through a hydrogen supply pipe 17 to the hydrogen supply port 7. The hydrogen supply pressure is controlled by a pressure control valve 18 which is provided in an intermediate location in the hydrogen supply pipe 17. An electromagnetic pressure control valve or a throttle valve is used as the pressure control valve 18.

Since hydrogen gas has wide inflammable limits both in rich and lean ranges, the engine rotation can be controlled by controlling its supply amount even if the air flowing into the intake port 6 is not controlled by a throttle valve. It follows that normally there is no need to provide a throttle valve. However, in a region of extremely low-load conditions, such as in idling, there are cases where an extremely lean condition occurs in which the hydrogen amount is particularly small relative to the suction air amount, thereby making it difficult to ignite. Therefore, a throttle valve 20 may be provided in an intake passage 19 which leads to the intake port 6 so that a rich condition can be made by reducing or closing the throttle valve 20 under an extremely low-load condition.

The above-mentioned electrostrictive actuator 12 and the pressure control valve 18 are controlled by a control apparatus 21 aided by a computer. This control apparatus 21 operates to generate a control output based on signals from an accelerator pedal opening degree sensor 22, a rotational speed sensor 23, a cooling water temperature sensor 24, and other appropriate sensors.

Figure 2:
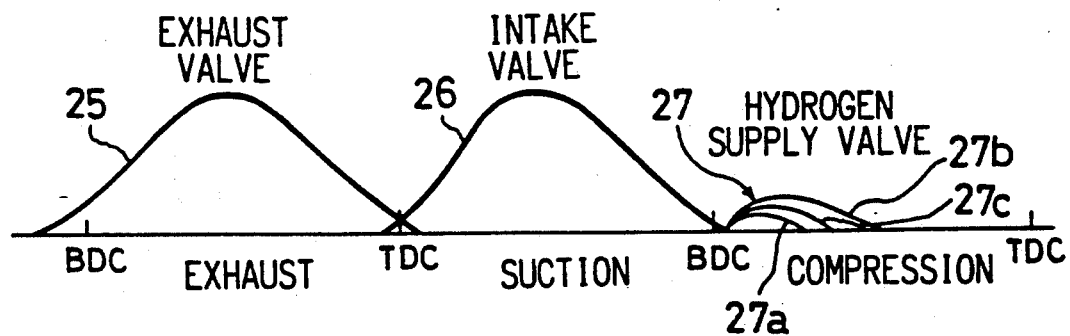
FIG. 2 is a diagram showing the valve timing.
Figure 3:
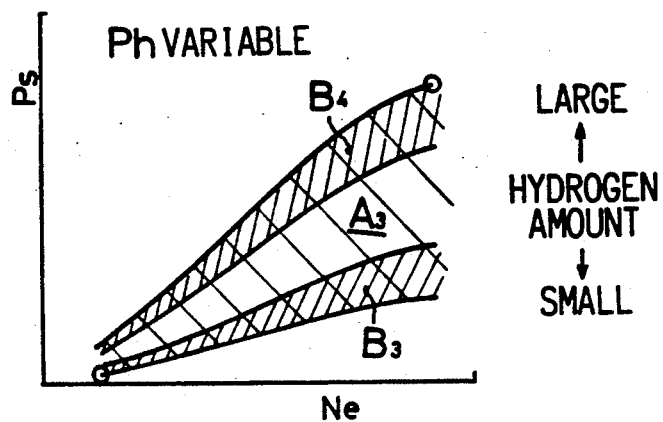
FIG. 3 is a diagram showing the operation of the engine of this invention.
Figure 5:
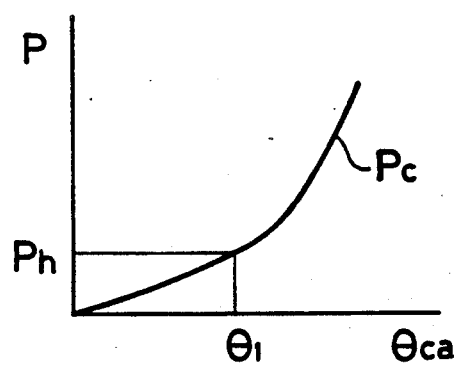
FIG. 5 is a diagram showing the operation of the hydrogen supply.
Figure 4A:
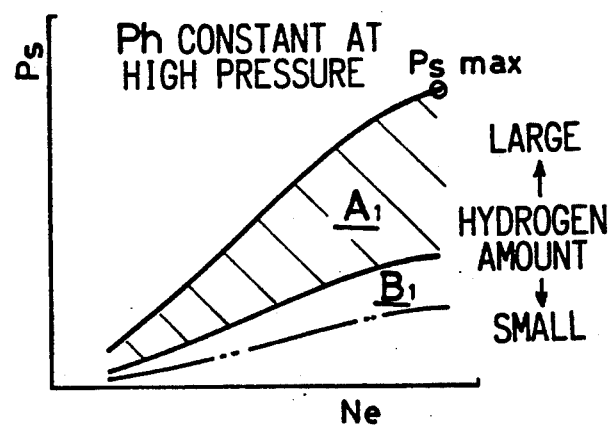
FIG. 4(a) and 4(b) are diagrams showing the operation of a conventional engine.
Figure 4B:
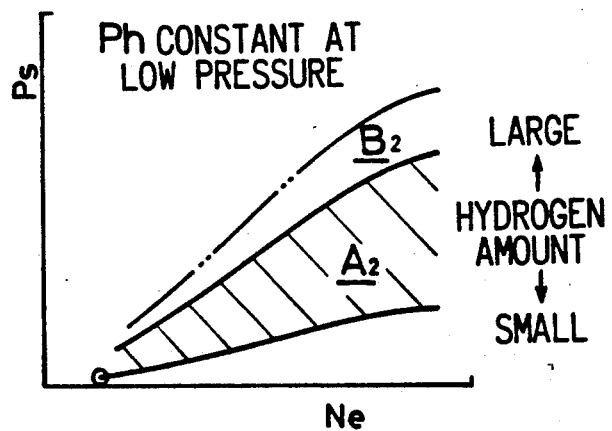

The intake valve 10 and the non-illustrated exhaust valve are driven by a crank shaft via a normal cam shaft and opens and closes in a timing shown in FIG. 2. In. FIG. 2, numeral 25 denotes an exhaust valve lift curve and numeral 26 denotes an intake valve lift curve. When the intake is finished near bottom dead center BDC of the crank shaft, the intake valve 10 is closed. When the compression stroke starts, the hydrogen supply valve 11 is opened as shown by curves 27 to supply hydrogen, and the hydrogen is mixed into the previously sucked air to perform a compression ignition. In the curves 27, numeral 27a denotes a minimum-load curve and numeral 27b denotes a maximum-load curve. A control is carried out between these two curves 27a, 27b depending on the load conditions. For example, numeral 27c denotes an intermediate-load curve to show an operation under an intermediate-load condition.

In the above-described apparatus, the hydrogen supply amount is mainly controlled by the pressure control valve 18. Normally, due to the manufacturing errors of the pressure control valve 18, or due to low control accuracies near the minimum or the maximum opening degree, pressure variations in the hydrogen supply source are likely to occur and the hydrogen supply amount is likely to be inaccurate at the time of idling rotation speed, a low-load condition, and a high-load condition. In this invention, however, in addition to the control by the pressure control valve 18, the lift and the valve timing of the hydrogen supply valve 11 are controlled by the control apparatus 21. Therefore, it is possible to supply an exact amount of hydrogen under all operating conditions.

In the above-described embodiment, the intake valve 10 and the non-illustrated exhaust valve are arranged to be driven by the cam. They may, however, be arranged to be hydraulically driven. In addition, the control by means of the hydrogen supply valve 11 may be employed only under one of either the low-load condition or the high-load condition.

As described above, in this invention, the lift and the valve timing of the hydrogen supply valve is controlled aside from the control of the hydrogen pressure. Therefore, adjustment can be made without extremely throttling the hydrogen pressure control valve in the low-load operating region, especially during idling rotation. This brings about an advantage in that the amount of hydrogen supply can be maintained highly accurate. In addition, an accurate adjustment can also be made in a high-load operating region. Furthermore, if the control apparatus is set such that the hydrogen supply pressure becomes high under the high-load operating condition, the flow area of the pressure control valve can be minimized. This brings about another advantage in that the pressure control valve can be made smaller.

It is readily apparent that the above-described method of controlling the fuel in a hydrogen-fueled engine has the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A method of controlling the supply of fuel in a hydrogen-fueled engine having an intake valve, a hydrogen supply valve and an exhaust valve with each of said valves being operated to open and close relative to a combustion chamber, and a control valve provided in a hydrogen supply pipe to control an output of said engine through control of a flow amount of hydrogen, said control valve being a pressure control valve for adjusting the pressure of hydrogen to be supplied, said hydrogen supply valve being operated by means capable of adjusting lift and valve timing of the hydrogen supply valve, wherein said method is characterized in that the amount of hydrogen being supplied to said combustion chamber is controlled based on control signals corresponding to load conditions by both said pressure control valve and said hydrogen supply valve under at least one of a low-load condition and a high-load condition, and substantially only by said pressure control valve under an intermediate-load condition.

2. The method of controlling the supply of fuel in a hydrogen-fueled engine according to claim 1, wherein the lift of said hydrogen supply valve is controlled by an electrostrictive actuator.

3. The method of controlling the supply of fuel in a hydrogen-fueled engine according to claim 1, wherein the amount of hydrogen being supplied to said combustion chamber is controlled by both said pressure control valve and said hydrogen supply valve under both low-load and high-load conditions.

4. The method of controlling the supply of fuel in a hydrogen-fueled engine according to claim 1, wherein the supply of air is controlled under a low-load condition.

5. A method of controlling the supply of fuel in a hydrogen-fueled engine having an air intake valve and a separate hydrogen supply valve with each of said valves being operated to open and close relative to a combustion chamber, for separately supplying air and hydrogen to the combustion chamber, and pressure control means for controlling the pressure of the hydrogen supplied to the hydrogen supply valve, said hydrogen supply valve having means for adjusting the opening thereof, wherein said method includes the steps of controlling the amount of hydrogen being supplied to said combustion chamber by both of said pressure control means and said hydrogen supply valve under at least one engine operating condition and substantially only by said pressure control means under another different engine operating condition.

6. The method of claim 5, wherein the amount of hydrogen being supplied to said combustion chamber is controlled by both said pressure control means and said hydrogen supply valve under at least one of either a low-load or a high-load engine conditions.

7. The method of claim 5, wherein said engine operating conditions are determined by sensing at least engine speed, an engine throttle opening and engine temperature.

* * * * *